United States Patent Office 3,035,354
Patented May 22, 1962

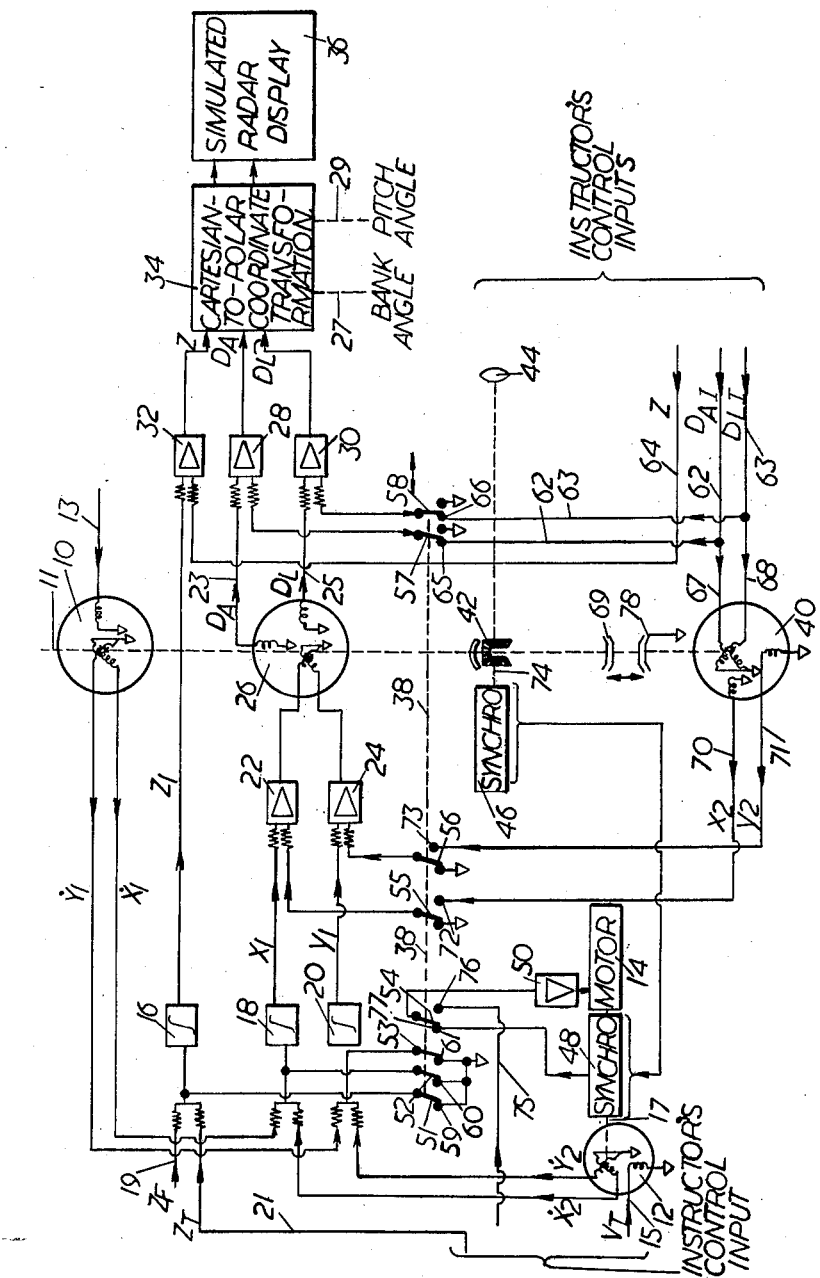

3,035,354
TRAINING DEVICES
William Douglas George Greenhalf, Aylesbury, England, assignor to General Precision Systems Limited
Filed June 2, 1958, Ser. No. 739,125
Claims priority, application Great Britain June 5, 1957
10 Claims. (Cl. 35—10.2)

This invention relates to training devices which include an axis transformation computer system automatically and continuously converting the position coordinates of two simulated bodies moving independently in a common fixed axis system into the position coordinates of one of the bodies (hereinafter termed "the target body") in a reference axis system centered on and moving with the other body (hereinafter termed "the reference body").

The invention is more particularly concerned with such devices in which the reference body is assumed to be a vehicle, ship or aircraft operated by a trainee in accordance with the position and movements relative to him of the target body. An example of such a device is one in which a fighter aircraft pilot is trained in the interception and engagement of a hostile aircraft, for which purpose the pupil sits in the cockpit of a simulated aircraft, the flight controls of which appropriately regulate the simulated travel of the reference body, while the instructor operates controls which regulate the simulated travel of the target body. The relative position of the target body may be indicated to the trainee by optical illusion apparatus or simulated radar instruments regulated by the relative co-ordinate outputs of the axis transformation system.

The invention will be described herein with reference to a training device of this particular character, but it is to be understood that it is equally applicable to other devices of the general kind described above.

In a typical training exercise with such a device there are two phases—an interception phase in which the "flying" of the trainee is directed by "radio communication" from the instructor, acting as ground controller, to bring him to a point at which his optical or simulated radar equipment can pick up the target, and an engagement phase in which the trainee is guided by the optical or simulated radar equipment in making an attack on the target.

During the interception phase, the instructor has continuously to exercise skilled judgment to direct the pupil to the pick-up point in space. His task is made the more difficult since the space containing all possible pick-up points is moving continuously with the target. If the instructor errs, the trainee may fail to make an interception through no fault of his own. Moreover, it may be desirable to give the trainee intensive practice in an engagement phase starting at a particular nominated condition among the infinite variety of combinations of relative speeds, courses and attitudes, and the chances of even a highly skilled instructor bringing the trainee exactly to the unique pick-up point for this combination every time are obviously remote.

It is an object of the invention to enable these difficulties to be overcome.

According to the present invention, there is provided a training device in which simulated movements of a simulated target body are controlled by an instructor while simulated movements of a supposed reference body are controlled by a trainee in accordance with information received by him of the simulated target body movements, and wherein there are provided two alternatively effective sets of instructor's controls, one for pre-setting a position of the target body relative to the reference body which is to be maintained irrespective of the simulated movements of the reference body, and the other for controlling movements of the target body relative to a reference other than the simulated moving reference body, for example movements in a fixed earth axis system, with selector means for changing over command of the target body from one set of controls to the other.

By means of the first-mentioned set of controls, the instructor can predetermine, before the exercise begins, a specified position of the target in relation to the fighter which is maintained the same throughout the interception phase, so that the fighter-target relationship at the beginning of the engagement phase is determined in advance. He is thus free to direct the trainee in any type of representative interception phase without worrying about target position since the target is being "carried" by the fighter; when he decides that the trainee has reached the pick-up point, he so informs him and switches to the other set of controls, thereby "releasing" the target. At the instant of release, the target is at the predetermined position for pick-up but thereafter the instructor controls it to move independently of the fighter by the second set of controls.

In a typical form of interception training equipment here described by way of example, the trainee pilot occupies a dummy cockpit provided with representative flight, engine and auxiliary controls which operate through electronic analogue computer systems to provide on instruments the effects of take-off, climb and manoeuvre. This part of the equipment is usually referred to as a "flight simulator." Besides operating the pilot's flight and engine instruments appropriately, the computer system provides information as to the fighter's supposed heading, speed and rate of climb, which is fed as inputs to the axis transformation system, as will be described below with reference to the accompanying diagrammatic drawing.

The drawing shows the equipment embodied in the two sets of controls provided in accordance with the invention. Switching from one set of controls to the other is effected by means of a switch 38 which is shown in the drawings in the position appropriate to operation during the interception phase when the target and fighter are moving together.

The manner in which the axis transformation system operates during the engagement phase will be described first, it being assumed that the switch 38 is in the opposite position to that shown.

A resolver 10 is provided which is positioned in accordance with the fighter's heading in the "earth" XY reference system by a shaft represented at 11 and driven by the fighter's flight computer system (not shown). The resolver receives on conductor 13 an input voltage representing the horizontal component $V_F$ of the fighter's true speed and provides two output voltages representing the speed components $\dot{X}_1$ and $\dot{Y}_1$ of the fighter along the earth axes.

The target speed components $\dot{X}_2$ and $\dot{Y}_2$ are likewise obtained from a resolver 12 to which the instructor feeds a voltage on conductor 15 representing the horizontal speed $V_T$ of the target, and the shaft setting of which resolver represents the target's heading in the XY system. If the instructor wishes the target to turn, he feeds a "rate of turn" signal on conductor 75 to a motor 14 driving the resolver shaft 17.

The fighter's flight computer provides on conductor 19 a fighter rate of climb voltage $\dot{Z}_F$, and a potentiometer (not shown) controlled by the instructor provides on conductor 21 a target rate of climb $\dot{Z}_T$. These two rates are algebraically summed, and their difference is integrated with respect to time by an integrator 16, the output of which accordingly represents the vertical displacement $z_1$ of the target with respect to the fighter.

In a similar manner, the $\dot{X}_1$ and $\dot{Y}_1$ components of the fighter's airspeed from the resolver 10 are algebraically summed respectively with the $\dot{X}_2$ and $\dot{Y}_2$ components of the target's airspeed from the resolver 12, and the resultants fed to integrators 18 and 20 which give output voltages representing respectively horizontal displacement $x_1$ and $y_1$ of the target from the fighter. These two voltages from integrators 18 and 20 are fed through summing amplifiers 22 and 24 respectively (the purpose of which will be described later) to a resolver 26 which is positioned by the shaft 11 in accordance with the fighter's heading. The resolver 26 delivers on conductor 23 a voltage $D_A$, representing the horizontal distance by which the target is ahead (or astern) of the fighter, and on conductor 25 a voltage $D_L$, representing its horizontal displacement to port or starboard. The voltages $D_A$ and $D_L$ are passed respectively through summing amplifiers 28 and 30, while an amplifier 32 receives the voltage representing relative height $z_1$ directly from the integrator 16.

The three voltages $D_A$, $D_L$ and $z$ so obtained represent the cartesian co-ordinates of the target's position in a reference system of axes centered on the fighter and turning with it. Thus it will be seen that the computing apparatus thus far described comprises means responsive to inputs of simulated speed and simulated heading information of a simulated target body controlled by an instructor and a simulated reference body (the fighter) controlled by a trainee for deriving variable quantities (at amplifiers 28, 30 and 32) which represent at any instant the coordinates of the simulated target in a moving reference axis system based on the simulated reference body. The three variable voltage quantities are fed into an axis transformation system 34 embodying resolves (not shown in detail) positioned in accordance with the fighter's bank and pitch angles to the horizon by shafts 27, 29. The outputs of the system 34 are voltages representing the polar coordinates of the target's position with reference to the system formed by the fighter's own structural axes. They are applied to the control of a cathode ray tube 36 to simulate the display of an airborne radar. Thus axis transformation unit 34 and display 36 will be seen to comprise a channel for supplying target position information to the trainee.

The trainee is thus provided with a visual display on which he can follow the movement of the target with respect to himself as set by the instructor. The novel part of the apparatus shown is that concerned with the production of the voltages representing $D_A$, $D_L$ and $z$, and not the means for using them to provide a visual display.

When it is required that the target be "carried" i.e. during the interception phase, the switch 38, which has eight movable arms 51 to 58, is moved into the "target carried" position, which is the position of the switch shown in the figure. This applies to the summing amplifiers 28, 30 and 32, voltages representing values selected by the instructor for displacements $D_{AI}$, $D_{LI}$ and $z_I$ which define where the target is to be in relation to the fighter on release. They are selected by the instructor with the aid of potentiometers (not shown) and applied on conductors 62, 63, 64 respectively, the conductors 62 and 63 including contacts 65, 66 associated with the arms 57, 58 of the switch 38. At the same time the inputs to integrators 16, 18 and 20 are grounded by the arms 51, 52, 53 of the switch 38 at contacts 59, 60, 61 so that no $x_1$, $y_1$ or $z_1$ displacement voltages can build up and appear as inputs to the amplifiers 28, 30 and 32 to modify the input voltages $D_{AI}$, $D_{LI}$ and $z_I$ inserted by the instructor on conductors 62, 63 and 64.

At the instant the target is released, it is necessary that the fixed $D_{AI}$ and $L_{LI}$ displacement voltages selected by the instructor be converted, having regard to the fighter's heading at the instant, to voltages $x_2$ and $y_2$ representing the displacement of the target relatively to the fighter in the earth's axis system. For this purpose a further resolver 40, positioned in accordance with the fighter's heading by the shaft 11 is fed with the selected $D_{AI}$ and $D_{LI}$ voltages via conductors 67, 68. So that the $x_2$ and $y_2$ voltages are not modified in accordance with aircraft heading after the instant of release, a clutch 69 in the fighter heading shaft 11 is moved out of engagement, and the resolver shaft is simultaneously braked by a brake 73, with the result that the output of resolver 40 remains constant during the release period. The converted values $x_2$ and $y_2$, on conductors 70, 71 are the "starting" values of the engagement phase and are added to the $x_1$ and $y_1$ voltages developed by the independent speeds and flight paths of the aircraft and target, being supplied for this purpose to the amplifiers 22 and 24 by way of switch contacts 72, 73 associated with the switch arms 55, 56. The outputs of the amplifiers 22 and 24 are therefore continuously the sums of the $x_1$ and $y_1$ voltages and the "starting" $x_2$ and $y_2$ voltages, appropriate to the selected starting $D_{AI}$ and $D_{LI}$ voltages and the fighter and target speeds and headings, at each instant. Thus it will be seen that switch 38 is a means operable by the instructor at will for replacing the variable quantities ($D_A$ and $D_L$) fed to the indicator channel with fixed quantities ($D_{AI}$ and $D_{LI}$) pre-selected by the instructor to represent the coordinates of a target position, where the target position is a fixed position in the axis system of the reference body (figher aircraft).

The relative altitude $z$ between target and fighter is not affected by the change of the reference axis system, so that the only requirement is that amplifier 32 "hold" the selected starting voltage $z$ and adds algebraically to it the increments and decrements built up by the integrator 16 after the target is released.

A desirable additional feature enables the instructor to predetermine the direction, relative to the fighter's heading, in which the target takes up its movement at the instant of release. To do this, the resolver 12 must be continuously maintained at the selected heading of the target translated into the earth XY reference system, since it must start at this heading on being released. This is done by a differential gear 42 on the shaft 11 which gear algebraically sums the selected target heading relative to the fighter set in by an instructor's control knob 44 and the fighter's "XY" heading relative to the earth axis system. The output shaft of the differential 42 consequently logs the target's heading in the earth axis system, and the shaft of the resolver 12 is positionally slaved to this by any conventional means, such as by the two coupled synchros 46 and 48 shown. During the engagement phase the rate of turn signal set up on conductor 75 by the instructor is fed via a switch contact 76, associated with the arm 54 of the switch 38, to an amplifier 50 and thence to the motor 14, but during the interception phase the arm 54 is switched to contact 77 to feed an error signal from the receiver synchro 48 to the amplifier 50 and motor 14, to drive the shaft of the resolver 12 to a null position.

With regard to the inputs to the apparatus shown in the figure of fighter heading horizontal component of airspeed and rate of climb, these are all quantities commonly available in known kinds of flight trainer or simulator, and their derivation need not be explained here. Cartesian-to-polar coordinate transformation systems of a kind suitable for use as the system 34 in the figure are also well known in the art, making detailed description unnecessary.

In conducting a typical operation the instructor will select his first set of controls and set them so as to hold the target in a predetermined position and direction of incipient movement in the fighter's axis system whatever manoeuvres the latter may perform. He is then free to direct the pupil to take off, climb and turn and follow a representative interception flight. When he decides that the pick-up point has been reached, he will inform the pilot where he may expect to "see" his target and will switch over to his other set of controls, on which the target's rate of climb and airspeed will have been previously set up and will now be instantaneously acquired in the fixed earth reference system. From then on the pilot, having picked up the target at the predetermined position relative to himself, will pursue the engagement phase with the instructor manoeuvring the target as he thinks fit.

During the interception flight, when the target is not supposed to be within range of the radar equipment, signals to the latter may be prevented from reaching it until the instructor's selector switch is turned to the position appropriate to the engagement phase. Alternatively, the predetermined target position may be outside the supposed area of view of the radar equipment and at the beginning of the engagement phase the pilot may be given directions on how to turn to bring it into view.

Since changes may be made in carrying out the teaching of this application without departing from the scope of the invention, it is intended that all matter contained in the above description or shown in the accompanying drawings shall be considered as illustrative only and not in a limiting sense. For example the invention can be practised using D.C. or A.C. computation techniques, and the components described and shown may be replaced by other equivalent computer components.

It is also to be understood that the following claims are intended to cover all of the generic and specific features of the invention described herein, and all statements of the scope of the invention which, as a matter of language, might be said to fall therein.

I claim:

1. A training device comprising means responsive to inputs of simulated speed and simulated heading information in respect of a simulated target body controlled by an instructor and a simulated reference body controlled by a trainee for deriving a first plurality of variable quantities which represent the instantaneous coordinates of said simulated target in a moving reference axis system based on the simulated reference body, a channel supplying target position information to the trainee, means for feeding said plurality of variable quantities as inputs to said channel, and switch means operable by the instructor at will for replacing said variable quantities in said channel by other fixed quantities preselected by the instructor and representing the coordinates of a target position which is a fixed position in said axis system of the simulated reference body.

2. A training device as claimed in claim 1, wherein said means for deriving said first plurality of variable quantities comprises means responsive to speed and heading of said reference body for providing two quantities representing the components of velocity of said reference body along two rectangular axes of a fixed axis system, means responsive to speed and heading of said simulated target body for providing two further quantities representing the components of velocity of said target body along said same two axes of said fixed axis system, means for algebraically summing the four velocity components along the two axes to obtain resultant quantities and for integrating the resultant quantities to obtain a fourth pair of quantities representing the instantaneous distances along said axes of the target body from the reference body, and means for resolving said fourth pair of quantities in accordance with the heading of the reference body to translate said distances into coordinates of said target body in the moving axis system of said reference body.

3. A training device according to claim 1, further comprising means whereby the instructor can preselect the instantaneous heading which the target body will have relative to the reference body at the moment of change-over from command of the target in accordance with a preset position relative to the reference body to command of the target independent of the reference body.

4. An aircraft interception-training device comprising means for obtaining, in response to inputs of simulated speed and simulated heading of a simulated aircraft controlled by a trainee, quantities representing the components of velocity of the aircraft along two horizontal axes at right angles of a fixed earth axis system, means for obtaining, in response to inputs of simulated speed and simulated heading of a simulated target body controlled by an instructor, quantities representing the components of velocity of the target body along the same two axes of the fixed axis system, means for algebraically summing the four velocity components along the two axes and means for integrating the two summation resultants to obtain quantities representing the instantaneous distances along said axes of the supposed target body from the supposed reference body, means for resolving these distance quantities in accordance with the heading of the simulated aircraft to translate the distances into coordinates of the simulated target body in a moving axis system based on the aircraft, a channel supplying target-position information to the trainee, means for feeding said translated distance quantities as inputs to said channel, and switch means operable by the instructor at will for replacing said translated distance quantities by other fixed input quantities preselected by the instructor and representing coordinates of a target position which is a fixed position in said moving axis system of the simulated aircraft.

5. A training device according to claim 4, further comprising means to algebraically sum a flight computer analogue of simulated aircraft rate of climb and an instructor's input representing simulated target rate of climb and means to integrate the resultant, and means for feeding the integrated resultant as a further input to the channel supplying target-position information to the trainee.

6. A training device according to claim 5, wherein the switch means includes contacts for removing the inputs of all the integrating means when the switch means is operated to replace said translated distance quantities in the trainee-information-channel by fixed quantities preselected by the instructor.

7. An aircraft interception-training device comprising a resolver receiving an electrical input potential commensurate with the horizontal component of simulated speed of a simulated aircraft controlled by a trainee, said resolver having a coil system adjustable angularly in accordance with simulated heading of the simulated aircraft to provide output potentials representing the components of velocity of the aircraft along two horizontal axes at right angles of a fixed earth axis system, a second resolver receiving an electrical input potential commensurate with the horizontal component of simulated speed of a simulated target body controlled by an instructor, said second resolver having a coil system, adjustable angularly in accordance with simulated heading of the simulated target body to provide output potentials representing the components of velocity of the target body along the same two axes of the fixed axis system, means for algebraically summing the four velocity component potentials along the two axes and for integrating the resultants to obtain potentials representing the instantaneous distances along said axes of the simulated target body from the simulated reference body, means for resolving these distance potentials in accordance with the heading of the simulated aircraft to translate them into potentials representing the coordinates of the simulated target body in a moving axis system based on the aircraft, a channel supplying target-position information to the trainee, means for feeding said translated coordinate potentials as inputs to said channel, and switch means operable by the instructor at will for replacing said translated coordinate potentials by other fixed input potentals preselected by the instructor and representing coordinates of a target position which is a fixed position in said moving axis system of the simulated aircraft.

8. A training device according to claim 7, further comprising means for algebraically summing a fixed instructor's input representing a preselected target heading relative to the simulated aircraft continuously with the input of simulated aircraft heading to provide a variable signal representing the target heading required relative to the earth axis system for maintaining the preselected heading relative to the aircraft, and means for switching over the resolver which follows target heading to control said resolver by said variable signal.

9. An aircraft interception-training device comprising a channel supplying information of the simulated position of a simulated target to a trainee, means for feeding to said channel three fixed inputs preselected by an instructor of which inputs the first represents a particular horizontal distance of the simulated target ahead or astern of a simulated aircraft controlled by the trainee, the second input represents a particular horizontal distance of the simulated target to port or starboard of the simulated aircraft, and the third input represents a particular vertical distance of the simulated target above or below the simulated aircraft, means for deriving, in response to inputs representing simulated aircraft and target speeds, headings and rates of climb, three variable coordinate quantities defining the instantaneous position of the simulated target relative to the simulated aircraft, and switch means operable for removing from said channel said first and second instructor-preselected fixed inputs and simultaneously supplying as inputs to said channel said three variable quantities.

10. An aircraft interception-training device comprising means for obtaining, in response to inputs of simulated speed and simulated heading of a simulated aircraft controlled by a trainee, quantities representing the components of velocity of the aircraft along two horizontal axes at right angles of a fixed earth axis system, means for obtaining, in response to inputs of simulated speed and simulated heading of a simulated target body controlled by an instructor, quantities representing the components of velocity of the target body along the same two axes of the fixed axis system, means for algebraically summing the four velocity component quantities along said axes and means for integrating the two summation resultants to obtain quantities representing the instantaneous distances along said axes of the simulated target body from the simulated reference body, a first resolver for resolving these distance quantities in accordance with the heading of the simulated aircraft to translate the distances into coordinates of the simulated target body in a moving axis system based on the aircraft, a channel supplying target-position information to the trainee, means for feeding into said channel fixed inputs preselected by an instructor of which inputs one represents a particular horizontal distance of the simulated target ahead or astern of the simulated aircraft and another input represents a particular horizontal distance of the simulated target to port or starboard of the simulated aircraft, means feeding said two fixed inputs additionally to a second resolver which operates in accordance with simulated aircraft heading to translate said fixed inputs into resolver output quantities representing distances along the horizontal axes of the fixed earth axis system, switch means actuable to modify the mode of operation of the device by removing said fixed preselected inputs from said channel and substituting for them said translated distance quantities from the first resolver, said switch means simultaneously applying the two resolver output quantities from the second resolver for algebraic summation respectively with the corresponding outputs of the integrating means, and means operable on actuation of the switch means for locking the second resolver to the instantaneous aircraft heading obtaining at the instant of switch actuation.

References Cited in the file of this patent
UNITED STATES PATENTS

| 2,716,234 | Lester et al. | Aug. 23, 1955 |
| 2,856,701 | Leskinen | Oct. 21, 1958 |